United States Patent
Abrams

(10) Patent No.: US 7,465,485 B2
(45) Date of Patent: Dec. 16, 2008

(54) PROCESS FOR DIMENSIONALIZING FLOCKED ARTICLES OR WEAR, WASH AND ABRASION RESISTANT FLOCKED ARTICLES

(75) Inventor: Louis Brown Abrams, Fort Collins, CO (US)

(73) Assignee: High Voltage Graphics, Inc., Fort Collins, CO (US)

( * ) Notice: Subject to any disclaimer, the term of this patent is extended or adjusted under 35 U.S.C. 154(b) by 165 days.

(21) Appl. No.: 11/000,672

(22) Filed: Nov. 30, 2004

(65) Prior Publication Data

US 2005/0158508 A1    Jul. 21, 2005

Related U.S. Application Data

(60) Provisional application No. 60/534,740, filed on Jan. 6, 2004, provisional application No. 60/532,782, filed on Dec. 23, 2003.

(51) Int. Cl.
*B32B 3/02* (2006.01)
*B32B 3/26* (2006.01)
*B32B 3/30* (2006.01)
*B32B 33/00* (2006.01)

(52) U.S. Cl. .............................. 428/90; 428/88; 428/89; 428/95

(58) Field of Classification Search .................. 428/90, 428/88, 89, 95
See application file for complete search history.

(56) References Cited

U.S. PATENT DOCUMENTS

| | | | |
|---|---|---|---|
| 1,905,989 A | | 4/1933 | Safir et al. |
| 1,905,999 A | | 4/1933 | Ellis |
| 1,992,676 A | | 2/1935 | Schwarz |
| 2,592,602 A | * | 4/1952 | Saks .......................... 264/441 |
| 2,636,837 A | | 4/1953 | Summers |
| 2,999,763 A | * | 9/1961 | Sommer ..................... 427/206 |
| 3,099,514 A | | 7/1963 | Haber |
| 3,215,584 A | * | 11/1965 | McConnell et al. ........... 428/90 |
| 3,271,370 A | | 9/1966 | Akin et al. |
| 3,314,845 A | | 4/1967 | Perri |
| 3,331,889 A | | 7/1967 | Caldwell et al. |

(Continued)

FOREIGN PATENT DOCUMENTS

AT            93 557 B       8/1989

(Continued)

OTHER PUBLICATIONS

Declaration of L. Brown Abrams under 37 CFR § 1.98 for U.S. Appl. No. 10/394,357 dated Jan. 3, 2007, 4 pages with Appendix A-I.

(Continued)

*Primary Examiner*—Cheryl Juska
(74) *Attorney, Agent, or Firm*—Sheridan Ross P.C.

(57) ABSTRACT

In one embodiment, a method for producing a decorative article, comprising:
  (a) providing a flocked surface, the flocked surface comprising a plurality of flock fibers and an activatable adhesive, wherein the activatable adhesive is less than 50% activated;
  (b) dimensionalizing the plurality of flock fibers, such that a first set of fibers is embedded to a greater distance in the activatable adhesive than a second set of fibers; and
  (c) after dimensionalizing, at least substantially fully activating the activatable adhesive to form the decorative article.

28 Claims, 3 Drawing Sheets

U.S. PATENT DOCUMENTS

| | | |
|---|---|---|
| 3,331,890 A | 7/1967 | Caldwell et al. |
| 3,377,232 A | 4/1968 | Mencock et al. |
| 3,381,058 A | 4/1968 | Caldwell et al. |
| 3,432,446 A | 3/1969 | Coppeta |
| 3,459,579 A * | 8/1969 | Newman .................. 427/200 |
| 3,496,054 A * | 2/1970 | Baigas, Jr. .................. 428/89 |
| 3,529,986 A | 9/1970 | Kappas et al. |
| 3,565,742 A | 2/1971 | Stephens et al. |
| 3,591,401 A | 7/1971 | Snyder et al. |
| 3,622,434 A | 11/1971 | Newman |
| 3,630,990 A | 12/1971 | Neal |
| 3,644,267 A | 2/1972 | Jackson, Jr. et al. |
| 3,654,232 A | 4/1972 | Jackson, Jr. et al. |
| 3,657,060 A | 4/1972 | Haigh |
| 3,660,200 A | 5/1972 | Anderson et al. |
| 3,674,611 A | 7/1972 | Petry et al. |
| 3,734,813 A | 5/1973 | Pohl |
| 3,772,132 A * | 11/1973 | Dulin .................. 428/90 |
| 3,775,205 A | 11/1973 | Hermann et al. |
| 3,793,050 A | 2/1974 | Mumpower, Jr. |
| 3,803,453 A | 4/1974 | Hull |
| 3,816,060 A | 6/1974 | Koskolos |
| 3,816,211 A | 6/1974 | Haigh |
| 3,837,946 A | 9/1974 | Gribbin |
| 3,887,737 A | 6/1975 | Baxter et al. |
| 3,900,676 A | 8/1975 | Alderson |
| 3,903,331 A | 9/1975 | Klein |
| 3,917,883 A * | 11/1975 | Jepson .................. 427/198 |
| 3,918,895 A | 11/1975 | Mizuno |
| 3,936,554 A | 2/1976 | Squier |
| 3,956,552 A | 5/1976 | Geary |
| 3,961,116 A | 6/1976 | Klein |
| 3,969,559 A | 7/1976 | Boe |
| 3,979,538 A | 9/1976 | Gilman et al. |
| 3,989,869 A | 11/1976 | Neumaier et al. |
| 4,018,956 A | 4/1977 | Casey |
| 4,025,678 A * | 5/1977 | Frank .................. 428/90 |
| 4,031,281 A | 6/1977 | Keeling |
| 4,034,134 A | 7/1977 | Gregorian et al. |
| 4,035,532 A | 7/1977 | Gregorian et al. |
| 4,062,992 A | 12/1977 | Power et al. |
| 4,079,047 A | 3/1978 | Jackson, Jr. et al. |
| 4,088,708 A | 5/1978 | Riew |
| 4,098,946 A | 7/1978 | Fuzek |
| 4,102,562 A | 7/1978 | Harper et al. |
| 4,104,439 A | 8/1978 | Fuzek |
| 4,110,301 A | 8/1978 | Zannucci et al. |
| 4,120,713 A | 10/1978 | Jensen et al. |
| 4,142,929 A | 3/1979 | Otomine et al. |
| 4,160,851 A | 7/1979 | Lienert et al. |
| 4,201,810 A | 5/1980 | Higashiguchi |
| 4,218,501 A * | 8/1980 | Kameya et al. .................. 428/90 |
| 4,238,190 A | 12/1980 | Rejto |
| 4,269,885 A | 5/1981 | Mahn |
| 4,273,817 A | 6/1981 | Matsuo et al. |
| 4,282,278 A | 8/1981 | Higashiguchi |
| 4,292,100 A | 9/1981 | Higashiguchi |
| 4,294,577 A | 10/1981 | Bernard |
| 4,294,641 A | 10/1981 | Reed et al. |
| 4,299,015 A | 11/1981 | Marcus et al. |
| 4,308,296 A | 12/1981 | Chitouras |
| 4,314,813 A | 2/1982 | Masaki |
| 4,314,955 A | 2/1982 | Boden et al. |
| 4,340,623 A | 7/1982 | Justus |
| 4,340,632 A | 7/1982 | Wells et al. |
| 4,352,924 A | 10/1982 | Wooten et al. |
| 4,362,773 A * | 12/1982 | Shikinami .................. 428/90 |
| 4,369,157 A | 1/1983 | Conner |
| 4,385,588 A | 5/1983 | Bennetot |
| 4,387,214 A | 6/1983 | Passmore et al. |
| 4,388,134 A | 6/1983 | Long et al. |
| 4,390,387 A | 6/1983 | Mahn |
| 4,396,662 A | 8/1983 | Higashiguchi |
| 4,405,401 A | 9/1983 | Stahl |
| 4,423,106 A | 12/1983 | Mahn |
| 4,430,372 A * | 2/1984 | Knoke et al. .................. 428/90 |
| 4,438,533 A | 3/1984 | Hefele |
| 4,465,723 A * | 8/1984 | Knoke et al. .................. 428/90 |
| 4,539,166 A | 9/1985 | Richartz et al. |
| 4,574,018 A | 3/1986 | Masuda et al. |
| 4,578,453 A | 3/1986 | Jackson, Jr. et al. |
| 4,582,658 A | 4/1986 | Reichmann et al. |
| 4,588,629 A * | 5/1986 | Taylor .................. 428/88 |
| 4,610,904 A | 9/1986 | Mahn, Sr. et al. |
| 4,650,533 A | 3/1987 | Parker et al. |
| 4,652,478 A | 3/1987 | Maii |
| 4,668,323 A | 5/1987 | Lenards et al. |
| 4,681,791 A | 7/1987 | Shibahashi et al. |
| 4,687,527 A | 8/1987 | Higashiguchi |
| 4,741,791 A | 5/1988 | Howard et al. |
| 4,790,306 A | 12/1988 | Braun et al. |
| 4,793,884 A | 12/1988 | Horikiri |
| 4,797,320 A | 1/1989 | Kopp et al. |
| 4,810,321 A | 3/1989 | Wank et al. |
| 4,810,549 A | 3/1989 | Abrams et al. |
| 4,812,247 A | 3/1989 | Fahner et al. |
| 4,834,502 A | 5/1989 | Bristol et al. |
| 4,859,732 A | 8/1989 | Minnick |
| 4,894,404 A | 1/1990 | Minnick |
| 4,895,748 A * | 1/1990 | Squires .................. 428/88 |
| 4,906,464 A | 3/1990 | Yamamoto et al. |
| 4,923,848 A | 5/1990 | Akada et al. |
| 4,931,125 A | 6/1990 | Volkmann et al. |
| 4,938,955 A | 7/1990 | Niira et al. |
| 4,938,958 A | 7/1990 | Niira et al. |
| 4,972,015 A | 11/1990 | Carico et al. |
| 4,980,216 A | 12/1990 | Römpp |
| 5,008,130 A | 4/1991 | Lenards |
| 5,009,950 A | 4/1991 | Wagner et al. |
| 5,021,289 A | 6/1991 | Light et al. |
| 5,026,591 A | 6/1991 | Henn et al. |
| 5,041,104 A | 8/1991 | Seal |
| 5,043,375 A | 8/1991 | Henning et al. |
| 5,047,103 A | 9/1991 | Abrams et al. |
| 5,053,179 A | 10/1991 | Masui et al. |
| 5,059,452 A * | 10/1991 | Squires .................. 428/88 |
| 5,077,116 A | 12/1991 | Lefkowitz |
| 5,106,944 A | 4/1992 | Sublett |
| 5,108,530 A | 4/1992 | Niebling, Jr. et al. |
| 5,112,423 A | 5/1992 | Liebe, Jr. |
| 5,115,104 A | 5/1992 | Bunyan |
| 5,126,182 A | 6/1992 | Lumb et al. |
| 5,144,334 A | 9/1992 | Suzuki et al. |
| 5,154,871 A | 10/1992 | Wagner et al. |
| 5,155,163 A | 10/1992 | Abeywardena et al. |
| 5,198,277 A | 3/1993 | Hamilton et al. |
| 5,207,851 A | 5/1993 | Abrams |
| 5,217,563 A | 6/1993 | Niebling et al. |
| 5,217,781 A | 6/1993 | Kuipers |
| 5,219,941 A | 6/1993 | Meyer, Jr. et al. |
| 5,239,020 A | 8/1993 | Morris |
| 5,248,536 A | 9/1993 | Du Katz |
| 5,274,039 A | 12/1993 | Sirinyan et al. |
| 5,302,223 A | 4/1994 | Hale |
| 5,306,567 A | 4/1994 | Kuo et al. |
| 5,342,892 A | 8/1994 | Vanderbilt et al. |
| 5,346,746 A | 9/1994 | Abrams |
| 5,348,699 A | 9/1994 | Meyer et al. |
| 5,350,474 A | 9/1994 | Yamane |
| 5,350,830 A | 9/1994 | Kuo et al. |
| 5,358,789 A | 10/1994 | Kuo et al. |
| 5,378,796 A | 1/1995 | George et al. |
| 5,382,628 A | 1/1995 | Stewart et al. |
| 5,383,996 A | 1/1995 | Dressler |

| | | | | | | |
|---|---|---|---|---|---|---|
| 5,385,773 | A | 1/1995 | Yau et al. | 6,387,472 B1 | 5/2002 | Reck et al. |
| 5,393,609 | A | 2/1995 | Chang et al. | 6,402,313 B1 | 6/2002 | Xu et al. |
| 5,395,692 | A | 3/1995 | White et al. | 6,425,331 B1 | 7/2002 | Xu et al. |
| 5,428,086 | A | 6/1995 | Minnick et al. | 6,428,877 B1 | 8/2002 | Suss et al. |
| 5,431,501 | A | 7/1995 | Hale et al. | 6,436,506 B1 * | 8/2002 | Pinter et al. .................. 428/86 |
| 5,432,230 | A | 7/1995 | Vanderbilt et al. | 6,439,710 B1 | 8/2002 | Hale et al. |
| 5,439,987 | A | 8/1995 | Scott et al. | 6,447,629 B1 | 9/2002 | Thompson et al. |
| 5,442,036 | A | 8/1995 | Beavers et al. | 6,450,098 B1 | 9/2002 | Hale et al. |
| 5,447,462 | A | 9/1995 | Smith et al. | 6,451,148 B1 | 9/2002 | Jenner |
| 5,451,626 | A | 9/1995 | Kumaki et al. | 6,486,903 B1 | 11/2002 | Wagner et al. |
| 5,464,909 | A | 11/1995 | Chang et al. | 6,488,370 B2 | 12/2002 | Hale et al. |
| 5,480,506 | A | 1/1996 | Mahn, Sr. et al. | 6,540,345 B1 | 4/2003 | Wagner et al. |
| 5,487,614 | A | 1/1996 | Hale | 6,631,984 B2 | 10/2003 | Thompson et al. |
| 5,488,907 | A | 2/1996 | Xu et al. | 6,648,926 B1 | 11/2003 | Immediato |
| 5,489,359 | A | 2/1996 | Yamane | 6,660,352 B2 | 12/2003 | Hsu et al. |
| 5,522,317 | A | 6/1996 | Hale et al. | 6,774,067 B2 | 8/2004 | Demott et al. |
| 5,529,650 | A | 6/1996 | Bowers et al. | 6,787,589 B2 | 9/2004 | Weaver et al. |
| 5,534,099 | A | 7/1996 | Yamamoto | 6,818,293 B1 | 11/2004 | Keep et al. |
| 5,543,195 | A | 8/1996 | Squires et al. | 6,836,915 B2 | 1/2005 | Song et al. |
| 5,555,813 | A | 9/1996 | Hale et al. | 6,929,771 B1 | 8/2005 | Abrams |
| 5,556,669 | A | 9/1996 | Sasaki et al. | 7,135,518 B2 | 11/2006 | Bandou et al. |
| 5,575,877 | A | 11/1996 | Hale et al. | 7,229,680 B1 * | 6/2007 | Crompton ..................... 428/89 |
| 5,590,600 | A | 1/1997 | Hale et al. | 2001/0006715 A1 * | 7/2001 | Pinter et al. .................. 428/90 |
| 5,597,637 | A | 1/1997 | Abrams et al. | 2001/0008039 A1 * | 7/2001 | Alboom et al. ............... 28/160 |
| 5,601,023 | A | 2/1997 | Hale et al. | 2001/0008672 A1 | 7/2001 | Norvell et al. |
| 5,622,587 | A | 4/1997 | Barthelman | 2002/0009571 A1 | 1/2002 | Abrams |
| 5,640,180 | A | 6/1997 | Hale et al. | 2002/0098329 A1 | 7/2002 | Abrams |
| 5,642,141 | A | 6/1997 | Hale et al. | 2003/0072889 A1 | 4/2003 | Abrams |
| 5,644,988 | A | 7/1997 | Xu et al. | 2003/0129353 A1 | 7/2003 | Abrams |
| 5,654,395 | A | 8/1997 | Jackson, Jr. et al. | 2003/0186019 A1 | 10/2003 | Abrams |
| 5,685,223 | A | 11/1997 | Vermuelen et al. | 2003/0203152 A1 | 10/2003 | Higgins et al. |
| 5,693,400 | A | 12/1997 | Hamilton et al. | 2003/0207072 A1 | 11/2003 | Abrams |
| 5,734,396 | A | 3/1998 | Hale et al. | 2003/0211279 A1 | 11/2003 | Abrams |
| 5,746,816 | A | 5/1998 | Xu | 2004/0050482 A1 | 3/2004 | Abrams |
| 5,756,180 | A | 5/1998 | Squires et al. | 2004/0053001 A1 | 3/2004 | Abrams |
| 5,762,379 | A | 6/1998 | Salmon et al. | 2004/0055692 A1 | 3/2004 | Abrams |
| 5,766,397 | A | 6/1998 | Jones | 2004/0058120 A1 | 3/2004 | Abrams |
| 5,771,796 | A * | 6/1998 | Morrison et al. ............... 101/22 | 2004/0081791 A1 | 4/2004 | Abrams |
| 5,804,007 | A | 9/1998 | Asano | 2004/0170799 A1 | 9/2004 | Carr et al. |
| 5,830,263 | A | 11/1998 | Hale et al. | 2004/0214493 A1 | 10/2004 | Smith |
| 5,858,156 | A | 1/1999 | Abrams et al. | 2005/0081985 A1 | 4/2005 | Abrams |
| 5,863,633 | A | 1/1999 | Squires et al. | 2005/0158508 A1 * | 7/2005 | Abrams ....................... 428/90 |
| 5,900,096 | A | 5/1999 | Zemel | 2005/0266204 A1 | 12/2005 | Abrams |
| 5,909,021 | A | 6/1999 | Duffy | 2005/0268407 A1 | 12/2005 | Abrams |
| 5,912,065 | A | 6/1999 | Kukoff | 2006/0026778 A1 | 2/2006 | Lion |
| 5,922,436 | A | 7/1999 | Banfield et al. | 2006/0029767 A1 | 2/2006 | Lion |
| 5,981,009 | A | 11/1999 | Iacono et al. | 2006/0142405 A1 | 6/2006 | Kijima |
| 5,981,021 | A | 11/1999 | McCulloch | 2006/0251852 A1 | 11/2006 | Abrams |
| 6,010,764 | A | 1/2000 | Abrams | 2006/0257618 A1 | 11/2006 | Bernabeu |
| 6,083,332 | A | 7/2000 | Abrams | 2007/0003761 A1 | 1/2007 | Miyazono et al. |
| 6,102,686 | A | 8/2000 | Eschenfelder | 2007/0022548 A1 | 2/2007 | Abrams |
| 6,103,041 | A | 8/2000 | Wagner et al. | 2007/0026189 A1 | 2/2007 | Abrams |
| 6,105,502 | A | 8/2000 | Wagner et al. | 2007/0102093 A1 | 5/2007 | Abrams |
| 6,110,560 | A | 8/2000 | Abrams | 2007/0110949 A1 | 5/2007 | Abrams |
| 6,113,149 | A | 9/2000 | Dukatz | 2007/0148397 A1 | 6/2007 | Abrams |
| 6,146,485 | A | 11/2000 | Iacono et al. | 2007/0289688 A1 | 12/2007 | Abrams |
| 6,152,038 | A | 11/2000 | Wagner et al. | 2008/0003399 A1 | 1/2008 | Abrams |
| 6,170,881 | B1 | 1/2001 | Salmon et al. | 2008/0006968 A1 | 1/2008 | Abrams |
| 6,171,678 | B1 | 1/2001 | Holeschovsky et al. | 2008/0050548 A1 | 2/2008 | Abrams |
| 6,202,549 | B1 | 3/2001 | Mitsam et al. | 2008/0095973 A1 | 4/2008 | Abrams |
| 6,224,707 | B1 | 5/2001 | Lion | 2008/0102239 A1 | 5/2008 | Abrams |
| 6,247,215 | B1 * | 6/2001 | Van Alboom et al. ......... 28/160 | 2008/0111047 A1 | 5/2008 | Abrams |
| 6,249,297 | B1 | 6/2001 | Lion | 2008/0113144 A1 | 5/2008 | Abrams |
| 6,257,866 | B1 | 7/2001 | Fritz et al. | 2008/0124503 A1 | 5/2008 | Abrams |
| 6,264,775 | B1 | 7/2001 | Holeschovsky et al. | | | |
| 6,277,312 | B1 | 8/2001 | Hansen et al. | | | |
| 6,296,908 | B1 | 10/2001 | Reihs et al. | | | |
| 6,299,715 | B1 | 10/2001 | Langsdorf et al. | AT | 135 427 T1 | 9/1992 |
| 6,341,856 | B1 | 1/2002 | Thompson et al. | AU | 606651 | 2/1988 |
| 6,348,939 | B1 | 2/2002 | Xu et al. | AU | 653994 | 3/1992 |
| 6,350,504 | B1 * | 2/2002 | Alboom et al. ............... 428/88 | BE | 0506601 | 9/1992 |
| 6,361,855 | B2 | 3/2002 | Mahn, Jr. et al. | CA | 757595 | 4/1967 |
| 6,376,041 | B1 * | 4/2002 | Morrison et al. ............... 428/89 | CA | 2010076 | 8/1990 |

FOREIGN PATENT DOCUMENTS

| | | |
|---|---|---|
| CA | 1306411 | 8/1992 |
| CA | 2064300 | 9/1992 |
| DE | 3883517 T2 | 8/1989 |
| DE | 69208910 T2 | 9/1992 |
| DE | 19734316 A1 | 2/1999 |
| DK | EP 0506601 T3 | 9/1992 |
| EP | FR 2543984 | 4/1983 |
| EP | 012656 | 10/1984 |
| EP | 0210304 A1 | 2/1987 |
| EP | 0280296 A3 | 8/1988 |
| EP | 0351079 A3 | 1/1990 |
| EP | 0506601 B1 | 3/1992 |
| EP | 0685014 B1 | 6/1995 |
| EP | 0913271 | 10/1998 |
| EP | 0989227 A2 | 3/2000 |
| EP | 1598463 | 11/2005 |
| FR | 1480860 | 5/1967 |
| FR | 2210149 | 7/1974 |
| FR | 9002623 | 3/1990 |
| FR | 2659094 A1 | 9/1991 |
| FR | 2784619 A1 | 4/2000 |
| FR | 2846202 | 4/2004 |
| GB | 1171296 | 11/1969 |
| GB | 1447049 | 8/1976 |
| GB | 1466271 | 3/1977 |
| GB | 2065031 A | 6/1981 |
| GB | 2101932 | 1/1983 |
| GB | 2126951 A | 4/1984 |
| GB | 2214869 B | 12/1991 |
| GB | 0506601 | 9/1992 |
| IE | 55104 | 4/1984 |
| IT | 2864BE/93 | 8/1989 |
| IT | 24637BE/96 | 6/1996 |
| JP | 52155270 | 12/1977 |
| JP | 54163934 | 12/1979 |
| JP | 56108565 A | 1/1980 |
| JP | 55079143 | 6/1980 |
| JP | 55147171 | 11/1980 |
| JP | 56058824 A | 5/1981 |
| JP | 56107080 | 8/1981 |
| JP | 56108565 | 8/1981 |
| JP | 56141877 A2 | 11/1981 |
| JP | 58062027 A | 4/1983 |
| JP | 59106944 A | 6/1984 |
| JP | 59115885 A | 7/1984 |
| JP | 60236738 | 11/1985 |
| JP | S61-146368 | 7/1986 |
| JP | 63118544 | 5/1988 |
| JP | S64-068582 | 3/1989 |
| JP | 01192538 | 8/1989 |
| JP | 02048076 | 2/1990 |
| JP | 04-169297 | 6/1992 |
| JP | 5201196 | 8/1993 |
| JP | 08-267625 | 10/1996 |
| JP | 10059790 | 3/1998 |
| JP | 11256484 | 9/1999 |
| JP | 2000084977 | 3/2000 |
| JP | 2000263673 | 9/2000 |
| JP | 2001270019 | 10/2001 |
| KR | 220373 | 6/1999 |
| KR | 2003063833 | 7/2003 |
| NO | 306099 | 6/1989 |
| SE | 329767 | 8/1989 |
| TW | 62640 | 7/1993 |
| WO | WO 79/01146 | 12/1979 |
| WO | PCT/US88/02828 | 8/1988 |
| WO | WO 89/01829 | 3/1989 |
| WO | WO 90/09289 | 8/1990 |
| WO | WO 1992/004502 | 3/1992 |
| WO | WO 94/19530 | 9/1994 |
| WO | WO 02/07959 A1 | 1/2002 |
| WO | WO 02/107959 | 1/2002 |
| WO | WO 02/09925 A1 | 2/2002 |
| WO | WO 02/058854 A1 | 8/2002 |
| WO | WO 03/031083 A1 | 4/2003 |
| WO | WO 2004/005023 | 1/2004 |
| WO | WO 2004/005600 | 1/2004 |
| WO | WO 2005/035235 | 4/2005 |
| WO | WO 2005/118948 | 12/2005 |
| ZA | 88/6259 | 4/1990 |
| ZA | 92/2154 | 2/1993 |

OTHER PUBLICATIONS

Second Supplemental Declaration of L. Brown Abrams under 37 CFR § 1.132 for U.S. Appl. No. 09/548,839 executed Jan. 7, 2003.
Supplemental Declaration of L. Brown Abrams under 35 CFR § 1.132 for U.S. Appl. No. 09/548,839 executed Oct. 23, 2002.
"Bicomponent Fibers", available at http://web.utk.edu/~mse/pages/Textiles/Bicomponent%20fibers.htm, Updated Apr. 2004, 8 pages.
International Preliminary Report on Patentability for International (PCT) Patent Application No. PCT/US04/42790, mailed Oct. 4, 2007.
U.S. Appl. No. 11/957,205, filed Dec. 14, 2007, Abrams.
U.S. Appl. No. 11/972,446, filed Jan. 10, 2008, Abrams.
U.S. Appl. No. 12/013,996, filed Jan. 14, 2008, Abrams.
U.S. Appl. No. 12/031,445, filed Feb. 14, 2008, Abrams.
"Polymers", Chemistry, Unit 16, date unknonwn, pp. 313-325.
Abrams, Brown, "Flocking A Touch of Velour" ScreenPrinting (Apr. 1987).
Abrams, Brown, "Part II: Flocking" ScreenPrinting (Jun. 1987).
Corterr Polymers,—(printed Mar. 8, 2004) http://www.swicofil.com/ptt.html, 4 pages.
Declaration of L. Brown Abrams Under 37 CFR § 1.132 for U.S. Appl. No. 09/621,830 dated Jan. 7, 2003.
Declaration of L. Brown Abrams Under 37 CFR § 1.98 for U.S. Appl. No. 09/735,721 dated Jan. 16, 2004, 2 pages.
Lou Reade Reports "Surface Attention" European Plastics News (May 2003), p. 26.
Sean O'Leary, "Standard Transfer vs. Dye Sublimation: Requirements and Conditions for the Two Processes," The Big Picture Magazine, available at http://www.signweb.com/digital/tips/digitaltip7.html, 2 pages, Nov. 8, 2005.
Sonics & Materials, Inc,, "Chart II Compatability of Thermoplastics" (undated), 1 page.
U.S. Appl. No. 29/058,551, filed Aug. 19, 1996, Abrams.
U.S. Appl. No. 09/548,839, filed Apr. 13, 2000, Abrams.
U.S. Appl. No. 09/621,830, filed Jul. 24, 2000, Abrams.
Bostik USA; "Automotive & Industrial Division: Web & Powder Adhesives" (2002), available at http://www.bostik.com/oem/web_adhesives.html, 2 pages.
Bostik USA; "Industrial Adhesives" (2001), 3 pages.
Bostik USA; Web & Powder Adhesives; 2000; 2 pgs.
Bostik, "Technical Data Sheet PE103 Web Adhesives", revised Feb. 7, 2006, 5 pages.
Cellusuede Procucts, Inc, "About Flock", Available at http://www.cellusuede.com/navabout.htm, KMK Media Group, copyright 2000, 1 pages.
Cellusuede Products, Inc, "FAQ's", Available at http://www.cellusuede.com/faq.html, KMK Media Group, copyright 2000, 2 pages.
Cellusuede Products, Inc, "Fiber Types", Available at http://www.cellusuede.com/about/types.html, KMK Media Group, copyright 2000, 4 pages.
Cellusuede Products, Inc, "Glossary of Terms", Available at http://www.cellusuede.com/glossary/index.html, KMK Media Group, copyright 2000, 2 pages.
Cellusuede Products, Inc, "Uses for Flock, Home Furnishings", Available at http://www.cellusuede.com/home.html, KMK Media Group, copyright 2000, 2 pages.
Stahls', New Product Bulletin; 7 pages, undated.
Studt et al.; "Versatality on a roll: Thermpolastic adhesive films"; Collano; Oct. 2002; 8 pages.
Declaration of L. Brown Abrams under 37 CFR § 1.98 for U.S. Appl. No. 10/394,357 dated Jan. 16, 2004, 4 pages with Appendix A-I.
Declaration of L. Brown Abrams under 37 CFR 1.132 for U.S. Appl. No. 09/735,721 dated Jan. 7, 2003.

Declaration of L. Brown Abrams under 37 CFR § 1.98 for U.S. Appl. No. 09/621,830 dated Jan. 16, 2004, 2 pages.

International Search Report for International (PCT) Patent Application No. PCT/US04/42790, mailed Aug. 30, 2007.

Written Opinon for International (PCT) Patent Application No. PCT/US04/42790, mailed Aug. 30, 2007.

* cited by examiner

PROCESS FOR DIMENSIONALIZING FLOCKED ARTICLES OR WEAR, WASH AND ABRASION RESISTANT FLOCKED ARTICLES

CROSS REFERENCE TO RELATED APPLICATIONS

The present application claims priority under 35 U.S.C. Section 119(e) to U.S. Provisional Application Ser. Nos. 60/532,782, filed Dec. 23, 2003, and 60/534,740, filed Jan. 6, 2004, both to Abrams and having the same title as the present application, each of which is incorporated herein by this reference.

The present application is related to U.S. Pat. Nos. 4,810,549; 5,047,103; 5,207,851; 5,346,746; 5,597,637; 5,858,156; 6,010,764; 6,083,332; 6,110,560; and U.S. patent application Ser. No. 09/629,746, filed Jul. 31, 2000, now U.S. Pat. No. 6,929,771; Ser. No. 09/735,721 filed Dec. 13, 2000, now U.S. Pat. No. 7,364,782; Ser. No. 09/621,830 filed Jul. 24, 2000, now U.S. Pat. No. 7,344,769; Ser. No. 29/058,551 filed Aug. 19, 1996, now abandoned; Ser. No. 09/548,839 filed Apr. 13, 2000, now abandoned; Ser. No. 09/973,113 filed Oct. 9, 2001, now abandoned; Ser. No. 10/265,206, filed Oct. 4, 2002, now U.S. Pat. No. 6,977,023; Ser. No. 10/613,981, filed Jul. 3, 2003; Ser. No. 10/614,340, filed Jul. 3, 2003; Ser. No. 10/613,982, filed Jul. 3, 2003, now abandoned; and Ser. No. 10/614,399, filed Jul. 3, 2003, now U.S. Pat. No. 7,351,368, all to Abrams and each of which is incorporated herein by this reference.

FIELD OF THE INVENTION

The present invention is directed generally to decorative articles and specifically to flocked articles.

BACKGROUND OF THE INVENTION

Flocked articles are gaining in popularity in a wide variety of applications, including textiles and molded articles. Flocked articles are formed by either direct flocking or transfer flocking techniques. In direct flocking, a suitable surface, such as an adhesive film, is flocked electrostatically with flock fibers. In transfer flocking, a temporary carrier sheet is coated with a release adhesive, the release adhesive flocked electrostatically with flock fibers, and a permanent adhesive applied to the free ends of the flock fibers. In either technique, an attractive, plush flocked article is produced.

To provide another "dimension" to a flocked surface, a current practice is to flock a wet adhesive or adhesive-coated substrate, and then contact the flock while the adhesive is still under pressure with a die containing a raised texture pattern. The adhesive is then dried and cured. Exemplary texture patterns include weave, paisley, linen and the like. The metal die is typically cylindrically shaped. The heat and pressure from the raised parts of the die force the fibers contacting the raised parts down into the adhesive because of the adhesive's thermoplastic properties. The adhesive holds the compressed fibers in place forming a two dimensional pattern. As will be appreciated, there can be additional dimensions with a multi-level die. The article is cooled and a heat embossed pattern results. A problem with such embossed articles is poor wear, washing and abrasion resistance because of relatively poor quality of adhesion (especially to most durable plastic fibers like nylon or polyester) and because of heat-sensitivity of the adhesive (it will soften or melt when exposed to heat, therefore reducing adhesion). The flock fibers are easily dislodged from the adhesive. Usually rayon or cotton or other "rough" or "porous" type natural fibers must be used to promote adhesion to the thermoplastic type adhesive.

To provide another type of flocked article having more wear and abrasion resistance, a current practice is to flock or heat transfer to a first (upper) surface of a thermosetting adhesive with flock fibers, dry and fully activate the adhesive, and then contact the second (lower) surface of the adhesive with a second adhesive, such as a pressure sensitive adhesive with carrier. The article can be applied to a desired substrate surface by peeling away the carrier and contacting the pressure sensitive adhesive with the substrate surface and applying pressure to the article. A problem with such articles is that they can deform for example with repeated abrasion to the fibers, providing a displeasing or aesthetically unattractive "wear pattern" appearing and reducing wear and abrasion resistance.

SUMMARY OF THE INVENTION

These and other needs are addressed by the various embodiments and configurations of the present invention. The present invention is directed generally to embossed decorative articles incorporating an activatable adhesive. As used herein, an "adhesive" refers to any substance, whether inorganic or organic, natural or synthetic, that is capable of bonding other substances together, typically by surface attachment, and an "activatable adhesive" is an adhesive that has both a reversible and irreversible states. In the reversible state, for example, the adhesive is softened and tacky after being exposed to heat and returns to its original condition when cooled. The adhesive may be returned to the reversible state when again exposed to heat. In the irreversible state, the adhesive is heated to a higher temperature than in the reversible state and sets irreversibly when cooled to a temperature below the elevated temperature. This property is typically associated with a cross-linking reaction of the molecular constituents induced by heat or radiation. After setting irreversibly, the adhesive does not pass through the reversible state when heat is reapplied. An example of an activatable adhesive is a thermoset adhesive.

In one embodiment, the present invention is directed to a flocking process and article in which a flocked surface, including an activatable adhesive, is dimensionalized, such as by embossing, when the adhesive is in a softened, but not yet fully activated state. The adhesive is thereafter fully activated to permanently hold the compressed flock fibers in position to form the desired dimensionalized pattern. The activatable adhesive is typically applied to the flock in the form of a pre-formed adhesive film. Dimensionalized patterns include, for example, various weave patterns.

In another embodiment, the present invention is directed to a flocking process and article in which a flocked surface including an activatable adhesive is bonded to a rigid or semi-rigid support film, such as a polycarbonate film, to provide improved wear and abrasion resistance.

The embodiments can provide inexpensive processes to produce flocked articles of high quality and thereby add an additional dimension to their value. Due to the irreversibility of thermosetting a thermoset adhesive, the articles are rugged and have excellent wear and abrasion resistance. Moreover, the use of a solid (self-supporting) pre-formed adhesive (thermoset) film provides an inexpensive and environmentally benign production process having a high capacity from the use of in-line processing.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Dimensionalized Flocked Article

Figure 1:
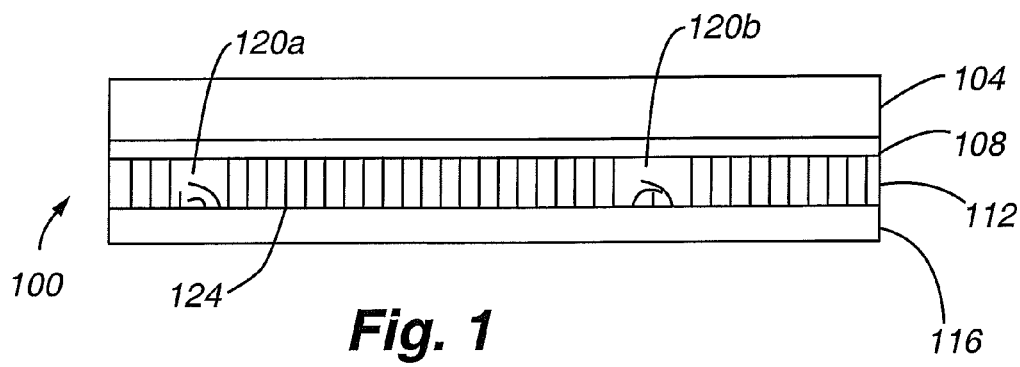
FIG. 1 is a cross-sectional view of a flocked article according to a first embodiment of the present invention.

FIG. 1 shows a dimensionalized article according to a first embodiment of the present invention. The article 100 includes a carrier sheet 104, a release adhesive 108, flock fibers 112, and a fully activated adhesive 116. Flock fibers in areas 120a and b are compressed by a dimensionalizing die to form a lowered area in the flock fibers 112. This creates a type of three-dimensional design, with the flock fibers adjacent to and between the areas 120a and b being raised relative to the compressed fibers. The compressed fibers may be pressed more deeply into the adhesive 116 (e.g., extend to a greater depth in the adhesive than the uncompressed fibers) and/or be oriented transversely to the uncompressed fibers (e.g., because they are oriented nonorthogonally to the upper surface 124 of the adhesive unlike the uncompressed fibers).

The carrier 104 can be any low-cost, dimensionally stable substrate, such as paper, plastic film, and the like. The sheet is preferably a discontinuous sheet or a running web line material.

The release adhesive 108 is selected such that the bonding force between the release adhesive 108 and the flock 112 is less than the bonding force between the (unactivated) adhesive 116 and flock 112. In this manner, the sheet and release adhesive can be removed after lamination of the transfer and before dimensionalizing without causing separation of the flock from the adhesive film. Preferred release adhesives include wax and silicone.

Figure 3:
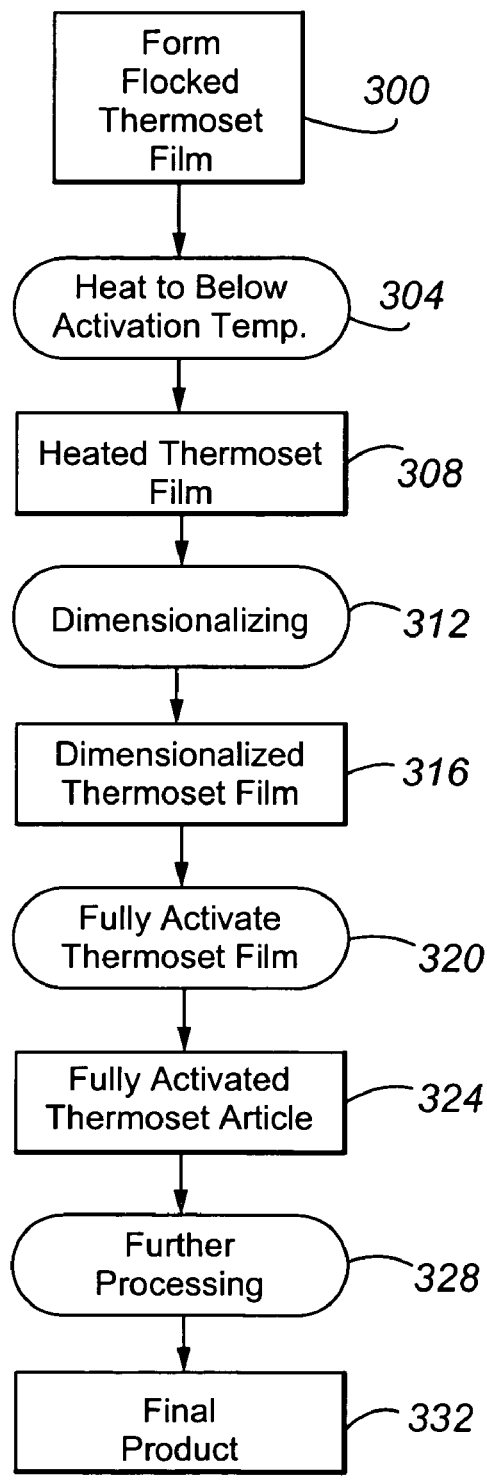
FIG. 3 is a flow chart of a process to manufacture a flocked article according to a third embodiment of the present invention.

The flock fibers 112 can be formed from any natural or synthetic material. Synthetic material includes rayons, nylons, polyamides, polyesters such as terephthalate polymers and acrylic, and natural material includes cotton and wool. In one configuration, a conductive coating or finish is applied continuously or discontinuously over the exterior surface of the flock fibers to permit the flock fibers to hold an electrical charge. The flock fibers 112 may be pre-colored (yarn-dyed or spun dyed) before application to the release adhesive 116 (or adhesive 116) or after the carrier 104 is removed, such as by sublimation dye transfer printed before or after the dimensionalizing step 312 (FIG. 3). Pre-colored fibers image can be registered to the dimensionalized image, so that color and texture are coordinated with each other for added design effect. For example in a image of a globe, the oceans could be pressed-down pre-colored blue fibers, the land areas could be full-length fibers in a light green and/or brown color.

Preferably at least most, and even more preferably at least about 75%, and even more preferably all, of the flock fibers have a preferred denier of no more than about 5, more preferably no more than about 3, and even more preferably no more than about 2, with a range of from about 1.5 to about 3.5 being typical and have a titre ranging from about 0.5 to about 20 Dtex (from about 0.5 to about $20 \times 10^{-7}$ Kg/in) and even more preferably from about 0.9 Dtex to about 6 Dtex, The length of at least most, and typically at least about 75%, of the fibers is preferably no more than about 4 mm, more preferably no more than about 2 mm, and even more preferably no more than about 1 mm, with a range of from about 0.3 to about 3.5 mm being typical. The fiber placement density relative to the surface area of the upper surface 124 of the substrate (on which the flock is deposited) is preferably at least about 50% fibers/in$^2$, even more preferably at least about 60% fibers/in$^2$, and even more preferably at least about 70% fibers/in$^2$ of the surface area of the substrate surface 124. The number of individual fibers per unit of surface area of the substrate surface 124 (on which the flock is applied) is preferably at least about 50,000 fibers/in$^2$, even more preferably at least about 75,000 fibers/in$^2$, and even more preferably at least about 100,000 fibers/in$^2$ of surface area of the substrate surface 124.

The adhesive 116 is an activatable adhesive that is preferably in the form of a pre-formed (self-supporting) film before contact with the flock. The adhesive is activated fully when it is heated above an activation temperature. The adhesive is preferably a high temperature adhesives, such as polybenzimidazoles and silica-boric acid mixtures or cements, hot-melt adhesives, thermoset adhesives, thermoplastic adhesives, polyurethane, and combinations and blends thereof. "Hot-melt adhesives" generally refer to a solid material that forms a mechanical or melt bond upon heating and subsequent cooling, "thermoset adhesives" generally refer to a polymer that solidifies or "sets" irreversibly when heated, and "thermoplastic" generally refer to a polymer that softens when heated and returns to its original condition when cooled to room temperature. The irreversible setting of the adhesive is commonly effected by cross-linking of at least most, if not all, of the polymers in the adhesive. The adhesive film can include fine particles of polymers or copolymers, as well as one or more of plasticizer(s), stabilizer(s), curing agent(s) (such as an isocyanate), pigment(s), etc. The pigment, if any, determines the color and opacity of the adhesive film. The stabilizer, used when pigment is added, prevents discoloration of the resin film. Thermoset adhesives can include curing agents such as organic peroxides or sulfur. Examples of thermosetting adhesives include polyethylene, polyurethanes, polyester, polyamides (nylon), phenolics, alkyds, amino resins, polyesters, epoxides, and silicones.

Typically, a thermosetting material is at least about 75 wt. % and even more typically at least about 95 wt. % of the adhesive 116.

FIG. 3 is a flowchart depicting a process to manufacture the article 100.

A flocked thermoset film 300 is first formed by direct flocking or flocked transfer techniques. In the former case, the flock fibers are applied, typically electrostatically, to a (thermally) softened thermosetting adhesive (or activatable adhesive 116) or to a second (non-activatable and non-thermosetting) adhesive (not shown) located on the surface 124 of the thermosetting adhesive (or activatable adhesive 116). When the flock is applied to a softened thermosetting adhesive, the thermosetting adhesive (or activatable adhesive 116) is heated to a temperature below the activation temperature to soften the adhesive and cause the thermosetting adhesive (or activatable adhesive 116) to be tacky (e.g., the thermosetting adhesive (or activatable adhesive 116) behaves thermoplastically during dimensionalization). When the flock is applied to the second adhesive, the thermosetting adhesive (or activatable adhesive 116) may be unsoftened when the second adhesive is flocked. In an article manufactured by direct flocking techniques, the carrier 104 and release adhesive 108 are omitted. In flocked transfer techniques, the release adhesive-coated carrier 104 is flocked, typically electrostatically, and the thermosetting adhesive (or activatable adhesive 116) applied to the free ends of the flock by a suitable technique (e.g., spraying, film lamination, and the like).

In step 304, the flocked thermosetting film 300 is heated to a temperature below the activation temperature of the adhesive to form a heated thermosetting film 308. The temperature is sufficient to soften the thermosetting adhesive (or activatable adhesive 116) and cause it to be tacky. In step 312 while the thermosetting adhesive (or activatable adhesive 116) is soft and tacky (or in the reversible state), the flocked thermosetting film 308 is contacted under pressure with a dimensionalizing die (not shown) (or roller). The die is applied to the upper ends of the flock fibers (the upper ends of the flock fibers opposite to the lower ends embedded in the thermosetting adhesive (or activatable adhesive 116)). The carrier sheet 104 may be present or absent during dimensionalizing. When present, the dimensionalizing die (or roller) is applied to the upper surface of the carrier 104 (which is opposite to the lower surface of the carrier in contact with the release adhesive 108). Alternatively, the carrier 104 is removed from the flock 112 before the dimensionalizing step 312. The dimensionalized thermoset film has a configuration similar to that of the article 100, with the activatable adhesive 116 being the thermosetting film (and the carrier 104 and/or release adhesive 108 being present or absent).

In one process configuration, dimensionalizing is performed without a die or roller by air embossing techniques. In this configuration, an air embossing screen enables a structured, embossed, or dimensionalized effect to be achieved on a flocked substrate. While the flock is still in the wet or tacky adhesive, air is blown through the open design areas of the screen onto the flock fibers. When the adhesive is cured or fully activated, the structured or embossed effect is permanent. Factors influencing the embossing effect by this technique include the flocking line speed, the rotation speed of the screen, the pressure of the blown air, the thickness of the screen, the distance between the flock and the screen, and the flock pile thickness and color. This process has the advantage over other dimensionalizing techniques, such as use of an embossing roller, that it does not require a separate off-line operation and a significant investment in a hot embossing cylinder. Apart from the cost and long delivery time, the handling of the heavy hot embossing cylinder requires a lifting device and special storage.

In step 320 the thermosetting film (or activatable adhesive 116) is heated to a temperature above the activation temperature to at least substantially fully activate the thermoset adhesive (or place the adhesive in the irreversible state). The adhesive is maintained at a temperature above the activation temperature for a time sufficient to fully activate or thermoset the adhesive to form a fully activated thermoset article 324 (which is similar in configuration to article 100 (with the activatable adhesive 116 being the thermosetting film and the carrier and/or release adhesive being present or absent). Typically, the adhesive 116 is at least substantially fully activated and more typically is at least about 75% fully activated.

The article 324 may be subjected to further processing steps to form a final product 332. For example, a pressure sensitive, high frequency weldable, or other type of adhesive may be applied to the second surface of the film 116 (the lower adhesive surface opposite the upper surface 124) and the article applied, such as by heat transfer techniques, to a suitable substrate, such as a textile. The article 324 may be incorporated into a molded article, such as by injection molding. When the article is used for in mold applications, a formable film (not shown) is applied to the second (lower) surface of the film 116 either before or after the dimensionalizing step 316 and in any event before the fully activating step 320. In a preferred configuration, the formable film is a formable thermoplastic material having a melting and/or softening point that is at or near the maximum processing temperature experienced by the film in later processing steps, such as molding. In molding, the maximum processing temperature is typically less than the melting point and maximum temperature of the resin to provide a melt bond and tensile and compressive strengths and thermal stability sufficient to withstand the maximum pressures experienced in the closed mold without warping or shrinking. The softening point of the formable film is typically slightly lower than the maximum temperature realized by the resin and substrate film during molding. As will be appreciated, it is important that the resin be chemically and physically (e.g., thermally) compatible with the formable film to produce a strong melt bond between materials and thus an integral article after removal from the closed mold. Preferably, the formable film is a polymeric material and the polymers in the formable film melt bond with the polymers in the resin. Exemplary formable films include monomers, oligomers, or polymers (which term includes copolymers, terpolymers, etc.) of styrene, acrylics, vinyls, olefins, cellulosics, carbonates, urethanes, amides, ethylenes, carbonates, propylenes, and esters, acrylic butyl styrene (ABS), and mixtures thereof A particularly preferred formable film for many resins is a polycarbonate. Thus, the film is able to withstand high pressure and high temperature without degrading, cracking, or melting. The formable film is preferably nonwoven and neither a textile nor a fabric. Preferably, the formable film, like the adhesive film, is in the form of a cast or extruded continuous film. Woven textiles and fabrics can resist forming into a three-dimensional or nonplanar shape due to the weave of the material.

When the article is used in molding applications, the flock 112 (either upper or lower ends) is subjected to printing, such as by sublimation-dye printing techniques, before the dimensionalizing step 312. Printing may occur, for example, before contact of the film 116 with the flock, or before or during step 304.

Other applications for the use of dimensionalized flock fibers on a fully activated thermoset adhesive 116 include:

the addition of a thermoplastic adhesive to the lower surface of the thermoset adhesive 116 form a heat transfer or applique (patch);

the use in heat transfer 3-D (insert) technology of U.S. Pat. Nos. 5,207,851; 5,346,746; 6,010,764; 6,083,332; and 6,110,560, each of which is incorporated herein by this reference;

the combination with elastic film to form stretch heat transfer or applique as described in U.S. patent application Ser. No. 10/163,981;

the addition to the lower surface of the adhesive 116 of poly(vinyl chloride) or PVC or other High Frequency (HF) Weldable media to make a high frequency weldable media applique or patch;

the addition to the lower surface of the adhesive 116 of PVC combined with PVC foam (or the PVC itself including foaming agent) for added dimensionalization where the foam would compress even further when heated with high frequency radiation and pressed together to form a weld;

the addition to the lower surface of the adhesive 116 of Polycarbonate or PC or another formable film for vacuum forming or In Mold Decoration as set forth in U.S. application Ser. Nos. 09/629,746; 10/394,357; 10/614,340; and 10/614,399;

the addition of anti-microbial additives as set forth in U.S. application Ser. No. 10/614,399 (though compressing a percent of the fibers may reduce the surface area and to that extent efficacy).

Figure 2:
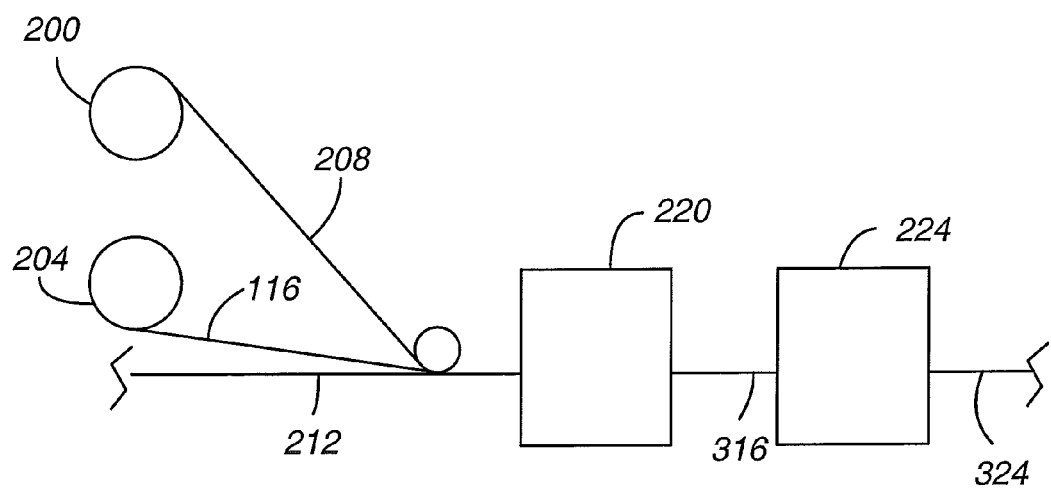
FIG. 2 shows a process configuration according to a second embodiment of the present invention.

FIG. 2 shows a possible process configuration to produce the fully activated thermoset article 324. The system includes a first roll 204 containing the thermosetting or activatable adhesive film 116 and a second roll 200 containing a substrate film 208. The pre-formed films 116 and/or 208 are contacted one on top of the other on a continuous running web line 212. The substrate film 208 can include the carrier 104, release adhesive 108, and flock 112.

The system includes a heating device and a pressurizing device 220, such as a lamination machine, to produce the dimensionalized thermoset film 316. The heating device heats the adhesive film 116 to a temperature above the softening point of the adhesive while the pressuring device applies pressure to the dimensionalizing die in contact with the free ends of the flock fibers and forces the fibers in contact with the raised areas of the die into the softened adhesive film. The raised areas of the die cause a differential pressure to be applied to different sets of fibers. In other words, more pressure is applied to some fibers (the compressed fibers) than to others (the uncompressed fibers). The softening and pressuring operations also cause the adhesive film 116 to adhere to the flock fibers generally.

Preferably, the adhesive 116 is heated to a temperature below the melting point and full activation temperature of the adhesive film 116. In other words, the adhesive film 116 in the product 216 is typically not yet fully cross-linked.

A second heating device 224 heats the film 316 to a temperature above the activation temperature for a time sufficient to fully cross-link the adhesive 116 to form the fully activated article 324.

Flocked Decorative Articles

Figure 4:
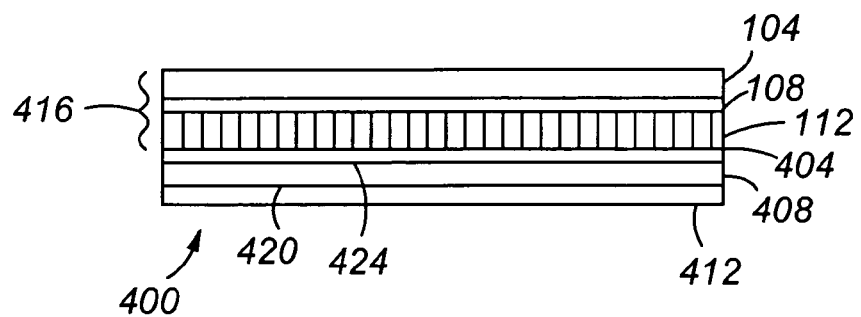
FIG. 4 is a cross-sectional view of a flocked article according to a fourth embodiment of the present invention.

FIG. 4 shows a flocked decorative article according to another embodiment of the present invention. The article 400 includes a carrier 104, a release adhesive 108, flock fibers 112, a first permanent adhesive 404, a support layer 408, and a second adhesive 412.

The first and second adhesives 404 and 412 can be any suitable adhesive film for the application, including those set forth above. In a preferred configuration, the first adhesive 404 is an activatable adhesive, with thermosetting adhesives being preferred, and the second adhesive 412 is a non-activatable adhesive, such as a pressure sensitive adhesive, a high frequency weldable adhesive, and the like.

The support film 408 is preferably a non-adhesive layer that has greater rigidity than the first and second adhesive layers 404 and 412, the flock layer 112, the release adhesive 108, and the carrier 104. The film 408 provides support to the article 400 to provide improved wear and abrasion resistance and prevent the film from conforming too precisely to undulations or irregularities in the substrate surface to which the article 400 is attached. Preferably, the support film 408 is a polymeric material that is self-supporting, deformable and/or semi-rigid. Preferred materials include monomers, oligomers, or polymers (which term includes copolymers, terpolymers, etc.) of styrene, acrylics, vinyls, olefins, cellulosics, carbonates, urethanes, amides, ethylenes, carbonates, propylenes, and esters, acrylic butyl styrene (ABS), and mixtures thereof. A particularly preferred support film for many resins is a polycarbonate. The support film is preferably nonwoven and neither a textile nor a fabric. Preferably, the support film, like the adhesive film 404, is in the form of a cast or extruded continuous film.

A preferable support film is a polycarbonate film sold under the tradename LEXAN. Typically, the film has a specific gravity of at least about 0.75, more typically at least about 1.00, and even more typically from about 1.00 to about 2.50.

The thickness of the support film 408 can have a significant impact on the wear and abrasion resistance of the article 400. Preferably, the thickness of the film 408 is at least about 5 mil, more preferably at least about 10 mil, and even more preferably ranges from about 5 mil to about 25 mil.

While not wishing to be bound by any theory, it is believed that the thickness and viscosity of the second adhesive 412 has an equal or greater influence on the wearability or abrasion resistance compared to the thickness of the film to which the first adhesive 404 is adhered.

Figure 5:
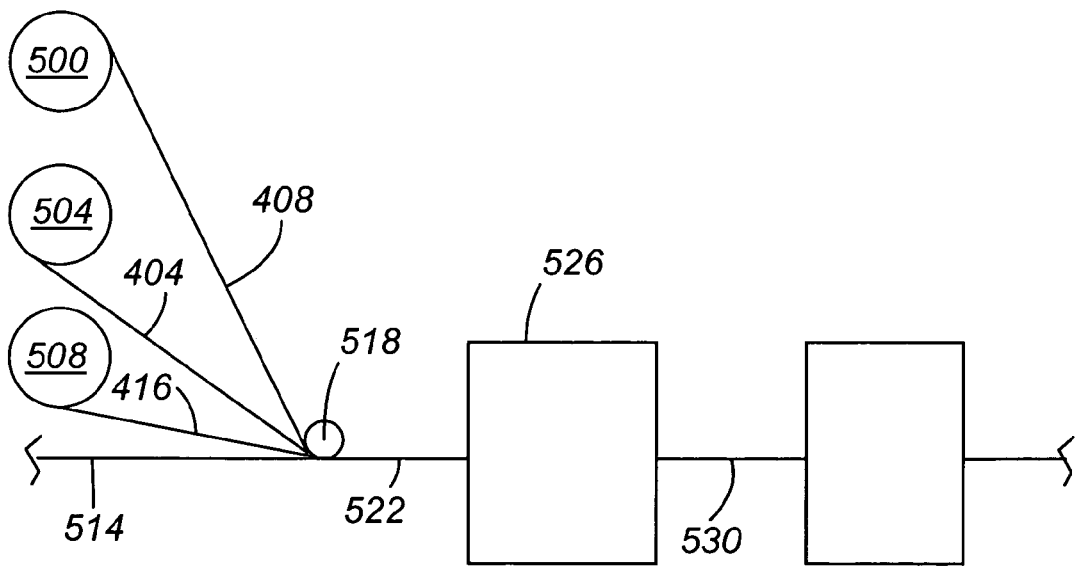
FIG. 5 shows a process configuration according to a fifth embodiment of the present invention.

A process to form the article 400 is shown in FIG. 5. A first roll 500 includes the support film 408, a second roll 504 includes the adhesive 404, and a third roll includes the flocked transfer 416 (with the carrier 104 facing and being in contact with the continuous webline 514 after the roller 518). The various films are contacted at the roller 518 to form an unbonded layered structure 522. In a heating and pressurizing device 526, the various layers are heated to a temperature to soften the adhesive film 404 and the various layers compressed under pressure to form a bonded layered structure 530. The temperature to which the adhesive is heated in the device 526 may be above or below the activation temperature of the adhesive, depending on the final use of the article 400. Typically, the adhesive 404 is at least substantially fully activated and more typically is at least about 75% fully activated when exiting the device 526. In a final station 534, the second adhesive 412 is applied to the surface 420 of the first adhesive 404.

As will be appreciated, the article 400 may be formed by direct flocking techniques. If direct flocked, the carrier 104 and release adhesive 108 are omitted. The article will have the flock 112, first and second adhesives 404 and 412 and support film 408. When direct flocking is used, the flock is flocked onto the first adhesive 404 when the first adhesive is softened or onto a third (non-activatable) adhesive, such as a tack adhesive, applied to the upper surface 424 of the first adhesive 404.

In any of the above processes, the flock is preferably applied by electrostatic flocking techniques such as described in U.S. Pat. Nos. 4,810,549; 5,207,851; 5,047,103; 5,346,746; 5,597,637; 5,858,156; 6,010,764; 6,083,332; and 6,110,560 and in copending U.S. patent application Ser. Nos. 09/548,839; 09/621,830; 09/629,746; and 09/735,721, each of which is incorporated herein by this reference. The flock is electrostatically charged (while the surface to which the flock is applied is given the opposite electrical charge).

Electrostatic flocking causes typically at least most, and even more typically at least about 65%, of the individual flock fibers to be oriented transverse to and typically perpendicular to the planes of the substrate surface (in direct flocking). Compared to woven textiles, this non-woven fiber alignment forms a desirable dense pile finish.

In these processes, different colors of flock (or fibers) are typically applied through separate screens or a single color flock is applied and later sublimation printed to form the multi-colored design. In multi-color flocking, the screens have a distribution of openings consistent with the desired locations of the respective colors of flock fibers. Other techniques, which can mount the flock in a desired position and in such a way as to hold or entrap the flock after curing, can also be employed in either the direct or transfer flocking process configurations. Such techniques include vibration, gravity, and spraying of the flock onto the adhesive-coated surface.

The techniques of the present invention can be used in any process for manufacturing decorative objects. For example, the techniques can be used in the manufacture of heat transfers, direct flocked articles, molded flocked articles, and the like, such as disclosed in the following patents/patent applications: U.S. Provisional Application Ser. No. 60/422,206, filed Oct. 29, 2002, entitled "Process for Printing a Flocked Article", to Abrams; U.S. Provisional Application Ser. No. 60/393,362, filed Jul. 3, 2002; 60/416,098, filed Oct. 4, 2002; 60/403,992, filed Aug. 16, 2002; 60/405,473, filed Aug. 23, 2002; 60/366,580, filed Mar. 21, 2002; 60/327,642, filed Oct. 5, 2001, 60/344,862, filed Nov. 8, 2001, and 60/332,647, filed Nov. 21, 2001; and 60/393,362, filed Jul. 3, 2002; U.S. Pat. Nos. 4,810,549; 5,047,103; 5,207,851; 5,346,746; 5,597,637; 5,858,156; 6,010,764; 6,083,332; 6,110,560; U.S. patent application Ser. No. 10/265,206, filed Oct. 5, 2002; Ser. No. 09/629,746, filed Jul. 31, 2000; Ser. No. 09/735,721 filed Dec. 13, 2000; Ser. No. 09/621,830 filed Jul. 24, 2000; Ser. No. 29/058,551 filed Aug. 19, 1996; Ser. No. 09/548,839 filed Apr. 13, 2000; and Ser. No. 09/973,113 filed Oct. 9, 2001, each of which is incorporated herein by this reference.

A number of variations and modifications of the invention can be used. It would be possible to provide for some features of the invention without providing others.

For example, dimensionalizing with the application of a combination of heat and pressure may be performed when the flocked thermoset film 300 is applied to a substrate, such as a textile. This is preferably effected using a transfer-type thermoset film 300 having a carrier 104 and release adhesive 108. The carrier 104 is preferably relatively thin and formable (such as PC film). The dimensionalizing die has an etched metal head. During transfer of the flocked film 300 to the substrate, the dimensionalizing die, which is mounted on a heat press, is contacted with the carrier 104 for a sufficient time to activate permanently the adhesive 116 and dimensionalize the flock fibers. This can be performed using a dual heating cycle in which the first cycle is at a temperature below the activation temperature to effect dimensionalization and the second cycle is at a temperature above the activation temperature to activate fully the adhesive 116.

In the process of FIG. 2 after the flock fibers 112 are temporarily located into (by heat transferring using the adhesive 116 below-activation-thermoplastic properties) or onto (by direct flocking onto a second adhesive applied to the surface 124) the thermoset adhesive 116, the dimensionalization may be done by any method of applying heat and pressure to force select fibers down into thermoset film which is heated to a softened or liquid state enabling fibers to penetrate far enough to create permanent adhesion (typically at least about 3% of the fiber length, more typically from about 5% to about 50% of the length of the compressed flock fiber). Examples of such methods include the use of a metal die, plastic form, air pressure or vacuum, water, magnetic, etc. Other suitable methods include high frequency heat with a die, a combination of laser (for heat) and stamping die (to dimensionalized while still hot), thermal heat, etc. Additionally, the thermoplastic film 116 could be heated to softening or liquid stage in a separate step and then a cold die could be used to both press the fibers down into the thermoset film while simultaneously beginning the cooling process; in other words, the die is actually cooled (like with a water or air jacket) to speed the cycle times.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An article manufactured by steps comprising:
   (a) providing a flocked surface, the flocked surface comprising a plurality of flock fibers and a pre-formed, self-supporting, solid, and thermosetting adhesive film, the thermosetting adhesive film being in a reversible state:
   (b) dimensionalizing the plurality of flock fibers to form compressed and uncompressed fibers, wherein the compressed fibers are embedded to a greater distance in the thermosetting adhesive film than the uncompressed fibers; and wherein the compressed and uncompressed fibers form a three-dimensional and pre-determined design; and
   (c) after dimensionalizing, activating the thermosetting to an irreversible state, the activated thermosetting adhesive film permanently locking the compressed and uncompressed fibers in position and form the decorative article.

2. The article of claim 1, wherein the uncompressed fibers are substantially orthogonal to the adhesive film.

3. The article of claim 1, wherein the article comprises flocked and unflocked surface areas and wherein flocked surface areas have a flock density of at least about 100,000 flock fibers per square inch.

4. The article of claim 1, wherein the providing step (a) comprises:
   (A1) providing a transfer, comprising the plurality of flock fibers having first and second opposing ends, wherein the first ends are adhered to a release adhesive coated on a carrier sheet;
   (A2) providing a cast or extruded film of the thermosetting adhesive; and
   (A3) heating and softening the film under pressure to embed the second opposing flock fiber ends of the transfer.

5. The article of claim 4, wherein the dimensionalizing step (b) further comprises:
   (B2) compressing selected flock fibers under pressure by air-embossing or contacting with a dimensionalizing die or roller, wherein the pressure applied to the compressed fibers is at least more than the pressure applied to the uncompressed fibers, and wherein the contacting comprises contacting the carrier sheet with the dimensionalizing die or roller.

6. The article of claim 1, wherein the flocked surface comprises a rigid or semi-rigid support layer, with the thermosetting adhesive film being located between the support layer and flock and further comprising, after the thermosetting adhesive is fully activated:
   (d) applying a second adhesive to the support layer, such that the support layer is positioned between the thermosetting adhesive film and second adhesive.

7. The article of 6, wherein the support layer has the following properties:
   (i) a specific gravity of at least about 0.75; and
   (ii) a thickness of at least about 5 mil.

8. The article of claim 1, wherein the dimensionalizing step (b) further comprises:
   (B1) compressing selected flock fibers under pressure by air-embossing or contacting with a dimensionalizing die or roller, and wherein the pressure applied to the compressed fibers is at least more than the pressure applied to the uncompressed fibers.

9. The article of claim 1, wherein at least 75% of the flock fibers have the following properties:
   (i) a denier of about 5 or less; and
   (ii) a length of about 4 mm or less.

10. The article of claim 1, wherein the thermosetting adhesive is selected from the group consisting of a polyurethane, a polyester, and a mixture thereof.

11. An intermediate decorative product, comprising:
    (a) a plurality of compressed and uncompressed flock fibers; and
    (b) a thermosetting adhesive film, wherein the thermosetting adhesive is in a reversible state, wherein the compressed fibers are embedded to a greater distance in the thermosetting adhesive film than the uncompressed fibers; and wherein the compressed and uncompressed fibers form a three-dimensional and selected design.

12. The intermediate decorative product of claim 11, wherein the uncompressed fibers are substantially orthogonal to the adhesive film.

13. The intermediate decorative product of claim 11, wherein the article comprises flocked and unflocked surface areas and wherein flocked surface areas have a flock density of at least about 100,000 flock fibers per square inch.

14. The intermediate decorative product of claim 11, further comprising:
    (c) a carrier sheet; and
    (d) a release adhesive adhering the flock fibers to the carrier sheet, wherein the flock fibers are positioned between the thermosetting adhesive film and carrier sheet.

15. The intermediate decorative product of claim 11, further comprising:
    (e) a rigid or semi-rigid support layer, wherein the thermosetting adhesive film is positioned between the flock fibers and the support layer.

16. The intermediate decorative product of claim 15, wherein the support layer has following properties:
    (i) a specific gravity of at least about 0.75; and
    (ii) a thickness of at least about 5 mil.

17. The intermediate decorative product of claim 11, wherein the thermosetting adhesive is selected from the group consisting of a polyurethane, a polyester, and a mixture thereof.

18. The intermediate decorative product of claim 11, wherein selected flock fibers are compressed under pressure by air-embossing or contacted with a dimensionalizing die or roller, and wherein the pressure applied to the compressed fibers is at least more than the pressure applied to the uncompressed fibers.

19. The intermediate decorative product of claim 11, wherein at least 75% of the flock fibers have the following properties:
    (i) a denier of about 5 or less, and
    (ii) a length of about 4 mm or less.

20. A decorative product, comprising:
    (a) a plurality of compressed and uncompressed flock fibers; and
    (b) a thermosetting adhesive film, wherein the thermosetting adhesive film is in the irreversible state, wherein the compressed fibers are embedded to a greater distance in the thermosetting adhesive film than the uncompressed fibers; and wherein the compressed and uncompressed fibers form a three-dimensional and controlled design.

21. The decorative product of claim 20, wherein the uncompressed fibers are substantially orthogonal to the adhesive film.

22. The decorative product of claim 20, wherein the article comprises flocked and unflocked surface areas and wherein flocked surface areas have a flock density of at least about 100,000 flock fibers per square inch.

23. The product of claim 20, further comprising:
    (c) a carrier sheet; and
    (d) a release adhesive adhering the flock fibers to the carrier sheet, wherein the flock fibers are positioned between the thermosetting adhesive film and carrier sheet.

24. The product of claim 20, further comprising:
    (e) a rigid or semi-rigid support layer, wherein the thermosetting adhesive film is positioned between the flock fibers and the support layer.

25. The product of claim 24, wherein the support layer has the following properties:
    (i) a specific gravity of at least about 0.75; and
    (ii) a thickness of at least about 5 mil.

26. The decorative product of claim 20, wherein the thermosetting adhesive is selected from the group consisting of a polyurethane, a polyester, and a mixture thereof.

27. The decorative product of claim 20, wherein the flock fibers are compressed under pressure by air-embossing or contacted with a dimensioanlizing die or roller, and wherein the pressure applied to the compressed fibers is at least more than the pressure applied to the uncompressed fibers.

28. The decorative product of claim 20, wherein at least 75% of the flock fibers have the following properties:
   (i) a denier of about 5 or less; and
   (ii) a length of about 4 mm or less.

* * * * *